(12) United States Patent
Ban et al.

(10) Patent No.: US 8,132,835 B2
(45) Date of Patent: Mar. 13, 2012

(54) WORKPIECE GRIPPING DEVICE

(75) Inventors: Kazunori Ban, Yamanashi (JP);
Fumikazu Warashina, Yamanashi (JP);
Shouta Takizawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 268 days.

(21) Appl. No.: 12/555,150

(22) Filed: Sep. 8, 2009

(65) Prior Publication Data
US 2010/0078953 A1 Apr. 1, 2010

(30) Foreign Application Priority Data

Sep. 30, 2008 (JP) ................. 2008-254508

(51) Int. Cl.
*B25B 7/00* (2006.01)
(52) U.S. Cl. ............................ 294/2; 294/183; 294/65.5
(58) Field of Classification Search .................. 294/2, 3,
294/106, 183, 65.5; 414/914
See application file for complete search history.

(56) References Cited

U.S. PATENT DOCUMENTS

| 3,306,646 | A | * | 2/1967 | Flora, Jr. ............................ 294/2 |
| 4,368,913 | A | * | 1/1983 | Brockmann et al. .......... 294/106 |
| 6,597,971 | B2 | | 7/2003 | Kanno |

FOREIGN PATENT DOCUMENTS

| EP | 1256860 A2 | 11/2002 |
| JP | 47034768 | 12/1972 |
| JP | 52069152 | 6/1977 |
| JP | 59034992 | 3/1984 |
| JP | 61163184 | 10/1986 |
| JP | 62159292 | 10/1987 |
| JP | 11020997 A | 1/1999 |
| JP | 2002331480 A | 11/2002 |
| JP | 2002331488 A | 11/2002 |
| JP | 2004025326 A | 1/2004 |
| JP | 2007139360 A | 6/2007 |
| JP | 2008023664 A | 2/2008 |

OTHER PUBLICATIONS

Notice of Reasons for Rejection for Japanese Application No. 2008-254508 mailed Jul. 20, 2010.

* cited by examiner

*Primary Examiner* — Saul Rodriguez
*Assistant Examiner* — Gabriela Puig
(74) *Attorney, Agent, or Firm* — Lowe Hauptman Ham & Berner LLP (57) ABSTRACT

A workpiece gripping device includes a primary catching mechanism having a suction pad adapted to hold a workpiece by suction power and a rod-like part having the suction pad mounted on one end thereof, gripping pawls sandwiching and gripping the workpiece, a drive unit for supplying a drive power, and a transmission mechanism transmitting the drive power of the drive unit to the gripping pawls. The transmission mechanism moves the gripping pawls along an axis of the rod-like part between a gripping position where the gripping pawls are projected beyond the suction pad and a retreated position where the gripping pawls are retreated from the suction pad toward the base plate. The gripping pawls are moved to the gripping position along the axis of the rod-like part while shortening the distance between the gripping pawls.

2 Claims, 6 Drawing Sheets

Fig. 3A  Fig. 3B  Fig. 3C

WORKPIECE GRIPPING DEVICE

RELATED APPLICATIONS

The present application is based on, and claims priority from, Japanese Application No. 2008-254508, filed Sep. 30, 2008, the disclosure of which is hereby incorporated by reference herein in its entirety.

BACKGROUND OF THE INVENTION

1. Field of the Invention

The present invention relates to a workpiece gripping device for gripping a workpiece, and in particular, to a workpiece gripping device used for a robot to pick up individual workpieces from densely stacked workpieces or workpieces stacked in a box.

2. Description of the Related Art

In a manufacturing process, many workpieces can be stacked at a predetermined place or in a storage box, and it is known to use a robot to automate the picking of individual workpieces and supplying the workpieces to a subsequent process. In a picking job, it is necessary to avoid interference between the robot (specifically, a workpiece gripping device thereof) and an object (for example, other workpieces or a side wall of the storage box) surrounding the workpiece to be picked. In order to meet this requirement, Japanese Unexamined Patent Publication No. 2002-331480 discloses a technique for automatically judging whether or not interference occurs.

The robot for performing the picking job is also provided with a workpiece gripping device, and various types of object gripping devices are known. For example, Japanese Unexamined Patent Publication Nos. 2007-139360 and 2008-23664 propose a device which grips an object by sucking an upper surface of the object and then pressing against the side surfaces of the object so as to sandwich it from both lateral sides. Japanese Unexamined Patent Publication Nos. 2002-331488 and 11-20997 also propose a device which grips a workpiece by inserting a thin-plate member into between workpieces closely contacting each other and pressing on the workpiece so as to sandwich it from both lateral sides using the inserted member. Further, Japanese Unexamined Patent Publication No. 2004-25326 proposes a device in which one gripping device has a plurality of griping mechanisms thereon and several types of workpieces can be picked using a gripping mechanism suitable for picking each type of workpiece.

As described above, the picking of individual workpieces from a stack of workpieces using the robot is performed while making sure that the workpiece gripping device does not interfere with an object surrounding the workpiece to be picked. When an interference occurs, an operator is required to interrupt the job in order to adjust the operation of the robot or seek a new job procedure causing no interference including a robot posture for workpiece picking. Therefore, in order to improve job efficiency, it is desirable to make it more difficult for interference to occur.

In the gripping devices disclosed in Japanese Unexamined Patent Publication Nos. 2007-139360 and 2008-23664, a member for gripping side surfaces of an object is provided on the lateral sides of a suction portion. Therefore, in the case where these gripping devices are used for picking a workpiece, a large space is necessary around the workpiece to be picked in order to prevent interference between the member for gripping the side surfaces of the workpiece and an object surrounding the workpiece. Especially for workpieces densely stored or located near the side surface of the storage box, no space can be secured around the workpieces and the workpieces are sometimes difficult to pick.

Further, in the gripping devices disclosed in Japanese Unexamined Patent Publication Nos. 2002-331488 and 11-20997, the thin plate member adapted to be inserted to between workpieces cannot be suitably inserted to between the workpiece closely contacting the wall and the wall of the storage box in which the workpieces are stacked. Therefore, it is sometimes difficult to pick such workpieces. Further, when inserting the member in between workpieces, the member inserted may cause measurable damage on the workpiece surface, depending on the type of the workpiece or the magnitude of the force exerted between the stacked workpieces. Therefore, the application of these gripping devices is limited.

The gripping device disclosed in Japanese Unexamined Patent Publication No. 2004-25326 has a plurality of gripping mechanisms and therefore is liable to become large. This also easily causes interference with an object surrounding the workpiece to be picked. Therefore, this gripping device is not suitable for carrying out a job in a limited space in a storage box or the like.

SUMMARY OF THE INVENTION

Accordingly, it is an object of the present invention to provide a workpiece gripping device which causes less interference with an object surrounding a workpiece to be picked and is applicable to various types of workpieces and suitable for the job of picking the workpiece out of a limited space.

In order to achieve this object, according to the present invention, there is provided a workpiece gripping device which includes a catching mechanism having a catching part capable of holding a workpiece by suction force or magnetic force and a rod-like part having the catching part mounted at an end thereof, at least two gripping pawls sandwiching and gripping the workpiece held by the catching part, a drive unit for supplying a drive power, and a transmission mechanism transmitting the drive power of the drive unit to the gripping pawls, wherein the transmission mechanism moves the gripping pawls along an axis of the rod-like part between a gripping position where the gripping pawls are projected beyond an end of the rod-like part on which the catching part is mounted and a retreated position where the gripping pawls are retreated behind the catching part toward an end of the rod-like part on the side opposite to the catching part, and the gripping pawls are moved to the gripping position along the axis of the rod-like part while shortening the distance between the gripping pawls.

According to this configuration, by arranging the gripping pawls at the retreated position, a state can be achieved in which no component parts of the gripping device other than the rod-like part supporting the catching part exists around the catching part. Therefore, the catching part can be brought near to the workpiece to be picked and the workpiece can be held and taken out by the catching part, while preventing the gripping device from interfering with objects surrounding the workpiece to be picked. In this process, the catching part holds the workpiece by suction force or magnetic force and therefore rarely damages the workpiece.

Further, the at least two gripping pawls are moved by the transmission mechanism to the gripping position along the axis of the rod-like part, while at the same time being moved so as to shorten the distance between the gripping pawls, i.e., so as to sandwich the workpiece. This motion of the gripping pawls makes it possible for the gripping pawls to grip the workpiece held by the catching part after the workpiece is caught and taken out by the catching part. By gripping the workpiece with the gripping pawls in this way, the stability in holding the workpiece is improved.

In the workpiece gripping device described above, the transmission mechanism preferably operates the gripping pawls while maintaining a constant posture of the gripping pawls with respect to the rod-like part. This operation can reduce the space in which the gripping pawls may interfere with the surrounding objects during the operation, as compared with the case in which the gripping pawls are moved while being rotated. Therefore, the gripping operation of the gripping pawls can be performed without moving the workpiece considerably after the workpiece has been caught by the catching part. As a result, efficiency of the picking process can be improved.

The transmission mechanism can be configured to include a movable base arranged nearer to the end of the rod-like part on the side opposite to the catching part than the gripping pawls and adapted to move along the axis of the rod-like part with respect to the rod-like part by the drive unit, groups of at least two first links each, each group arranged between each gripping pawl and the rod-like part, each of the first links of each group having one end rotatably coupled to corresponding one of the gripping pawls and the other end rotatably coupled to the rod-like part, and second links arranged on both sides of the rod-like part, each of the second links having one end rotatably coupled to one of the first links between corresponding one of the gripping pawls and the rod-like part and the other end rotatably coupled to the movable base.

The rod-like part may be configured to be moved by the drive unit along the axis of the rod-like part with respect to a gripping device base, and the transmission mechanism may include at least two base projection plates coupled to the gripping device base on both sides of the rod-like part and extending along beside the rod-like part, first links arranged on both sides of the rod-like part, each of the first links having one end rotatably coupled to corresponding one of the gripping pawls, a central portion rotatably coupled to corresponding one of the base projection plates, and the other end coupled to the rod-like part so as to be rotatable and slidable in a longitudinal direction of each of the first links, and second links each arranged between corresponding one of the gripping pawls and the rod-like part, each of the second links having one end rotatably coupled to corresponding one of the gripping pawls and the other end rotatably coupled to corresponding one of the base projection plates.

A gripping device base is adapted to be mounted on an arm of a robot, and the drive unit is preferably arranged one the side of a gripping device base nearer to an arm of a robot. This configuration can prevent the drive unit from interfering with an object surrounding the workpiece, thereby making it more difficult for interference to occur.

Further, the catching part is preferably positioned on a center line between the at least two gripping pawls. This configuration can reduce the operation amount of each gripping pawl in the direction perpendicular to the rod-like part to a minimum required to grip the workpiece without interference. As a result, space in which interference with the gripping pawls may occur during the gripping operation can be minimized.

According to the present invention, the catching mechanism configured to have the catching part mounted at the forward end of the rod-like part can initially take out the workpiece. Therefore, a workpiece gripping device can be provided which may not interfere with an object surrounding the workpiece to be picked and is suitable for picking the workpiece out of a limited space. The workpiece gripping device according to the present invention rarely damages the workpiece, and therefore is applicable to various types of workpieces.

BRIEF DESCRIPTION OF THE DRAWINGS

The above an other objects, features and advantages of the present invention will be described below in more detail based on preferred embodiments of the present invention with reference to the accompanying drawings, in which.

DETAILED DESCRIPTION

Preferred embodiments of the present invention will be described below with reference to the accompanying drawings.

First Embodiment

Figure 1A:
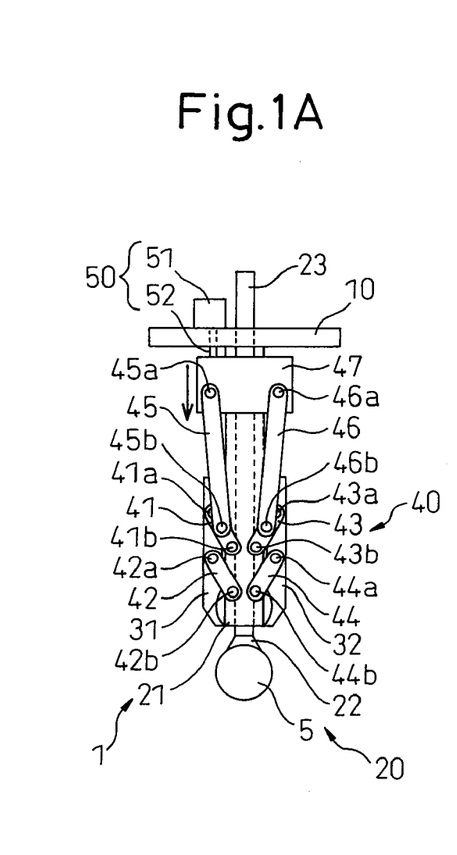
FIGS. 1A to 1D are schematic diagrams showing a gripping device according to a first embodiment of the present invention, FIGS. 1A to 1C being front views showing a gripping operation of the gripping device in time series and FIG. 1D being a side view of the gripping device shown in FIG. 1C.
Figure 1B:
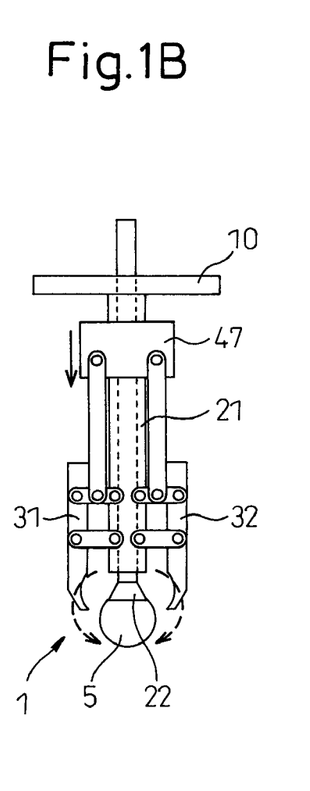
Figure 1C:
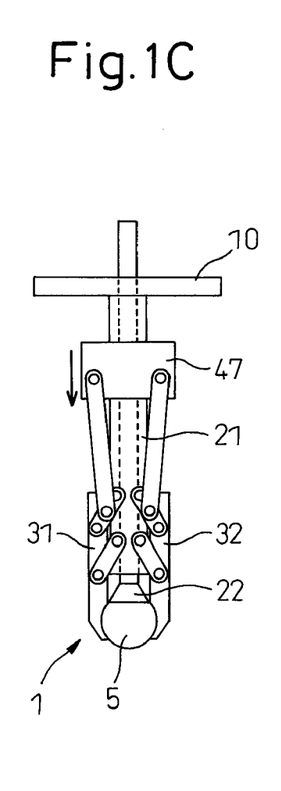
Figure 1D:
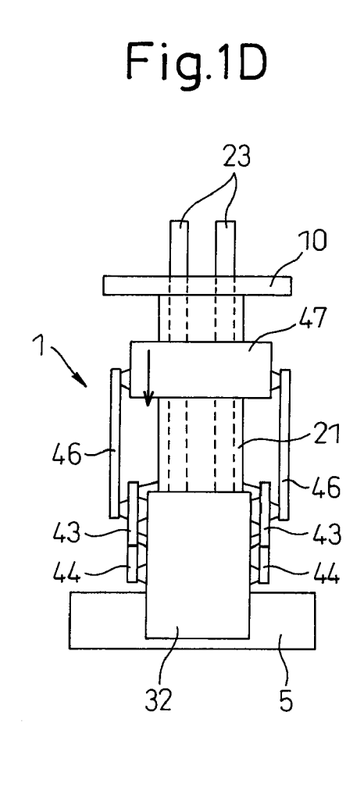

FIGS. 1A to 1D show a gripping device 1 according to a first embodiment of the present invention. As shown in the figure, this gripping device 1 is configured to catch a solid-cylindrical workpiece 5 by suction and further sandwich it from both lateral sides thereof to grip it. FIGS. 1A to 1C are front views as viewed in a direction parallel to an axis of workpiece 5 and show a gripping operation, in time series, after catching workpiece 5 by suction. FIG. 1D is a side view of gripping device 1 shown in FIG. 1C as viewed in a direction perpendicular to the axis of workpiece 5.

Gripping device 1 includes a base plate (gripping device base) 10 to be mounted at a forward end of an arm of a robot (not shown). The robot on which base plate 10 is mounted may have any of known configurations by which a position and a posture of base plate 10 or gripping device 1 can be changed as desired. The configuration of the robot is not directly related to the present invention and therefore a detailed explanation thereof will be omitted.

One end of a rod-like part 21 is mounted on base plate 10 so as to extend in a direction perpendicular to base plate 10, while a suction pad (catching part) 22 is mounted on the other end of rod-like part 21. A suction tube 23 is disposed to extend through rod-like part 21 and is connected to suction pad 22.

Therefore, by sucking an air between suction pad 22 and workpiece 5 through suction tube 23 with suction pad 22 closely contacting with workpiece 5, a predetermined holding force to hold workpiece 5 can be generated. In this way, rod-like part 21, suction pad 22 and suction tube 23 constitute a primary catching mechanism 20 for catching workpiece 5 by suction.

Suction pad 22 may be one as known having a shape conforming to a surface of workpiece 5 and an appropriate flexibility so that it can closely contact workpiece 5. A plurality of suction tubes 23 may be disposed along the axis of workpiece 5 in order to secure a predetermined suction effect over a predetermined area extending in a direction along the axis of workpiece 5. In the examples shown in FIGS. 1A to 1D, two suction tubes 23 are disposed. Two suction tubes 23 may be connected to a common suction pad 22 or each of two suction tubes 23 may be connected to corresponding one suction pad 22.

Rod-like part 21 constituting primary catching mechanism 20 has mounted thereon gripping pawls 31, 32 to the opposite sides of rod-like part 21 through link plates 41, 42; 43, 44, respectively. As seen in FIG. 1D, link plates 41 to 44 are disposed on both left and right sides of rod-like part 21 in FIG. 1D. However, in order to make the explanation understandable, link plates 41 to 44 on one side visible in FIGS. 1A to 1C will be described below as an example.

Link plate 41 has an elongate rectangle plate shape. One end of link plate 41 along a longitudinal direction is rotatably coupled to one gripping pawl 31 (located on the left side in FIGS. 1A to 1C) through a rotary joint 41a, while the other end thereof along the longitudinal direction is rotatably coupled to rod-like part 21 through a rotary joint 41b. Rotary joint 41b is mounted on a portion near an edge of rod-like part 21 on the side of gripping pawl 31. The rotation axis of each of rotary joints 41a, 41b extends parallel to the axis of workpiece 5 held by suction pad 22.

Similarly, link plate 42 has an elongate rectangle plate shape, and two ends along the longitudinal direction are coupled to gripping pawl 31 and rod-like part 21 through rotary joints 42a, 42b, respectively. The rotation axes of rotary joints 42a, 42b also similarly extend parallel to the axis of workpiece 5 held by suction pad 22. Rotary joints 42a, 42b of link plate 42 are located on the sides of link plate 41 nearer to suction pad 22 than rotary joints 41a, 41b, respectively.

The distance between rotary joints 41a and 41b is equal to the distance between rotary joints 42a and 42b. Therefore, when link plates 41, 42 are rotated, gripping pawl 31 maintains the same posture with respect to rod-like part 21. Gripping pawl 31 has a generally plate-like outer shape, and has a main surface thereof held in such a posture as to extend in a direction along rod-like part 21 and in a direction along the axis of workpiece 5 held by suction pad 22.

When gripping pawl 31 is in a retreated position where it is positioned nearer to base plate 10 as shown in FIG. 1A, the end of gripping pawl 31 nearer to suction pad 22 is positioned nearer to base plate 10 than suction pad 22. On the other hand, when gripping pawl 31 is positioned nearer to suction pad 22 as shown in FIG. 1C, the end of gripping pawl 31 nearer to suction pad 22 extends beyond suction pad 22 and can be projected to a position where it comes in contact with the side surface of workpiece 5 held by suction pad 22. The portion of gripping pawl 31 which is in contact with the side surface of workpiece 5 at this time is formed with a groove conforming to the surface of workpiece 5.

By arranging the other gripping pawl 32 in the same position at the same time, as described later, workpiece 5 is sandwiched from both lateral sides by two gripping pawls 31, 32 to be gripped. The position of gripping pawls 31, 32 will be hereinafter referred to as a gripping position.

Similarly, gripping pawl 32 is coupled to rod-like part 21 through a link plate 43, rotary joints 43a, 43b located at the ends of link plate 43, a link plate 44 and rotary joints 44a, 44b located at the ends of link plate 44. Rotary joints 43b, 44b are mounted on a portion near an edge of rod-like part 21 on the side of gripping pawl 32. The distance between rotary joints 43a and 43b is equal to the distance between rotary joints 44a and 44b. When gripping pawl 32 is in the retreated position, it is also positioned nearer to base plate 10 than suction pad 22, and when gripping pawl 23 is in the gripping position, the forward end of gripping pawl 32 is in contact with the side surfaces of workpiece 5 held by suction pad 22. The forward end of gripping pawl 32 is similarly formed with a groove conforming to the side surface of workpiece 5.

A movable base 47 is connected to link plates 41, 43 nearer to base plate 10 which are coupled to gripping pawls 31, 32 through link plates 45, 46, respectively. Movable base 47 is arranged between base plate 10 and gripping pawls 31, 32, and coupled to a drive unit 50 (shown only in FIG. 1A for convenience' sake) in order to be driven in a direction along the axis of rod-like part 21.

Drive unit 50 has a body 51 mounted on the side of base plate 10 opposite to rod-like part 21, i.e., on the side of base plate 10 attached to the arm of the robot. A drive shaft 52 driven so as to be extended and contracted extends from body 51. This drive unit 50 may be any one of known drive units configured by an air cylinder, a hydraulic cylinder, a motor or the like. Drive shaft 52 extends through base plate 10 and is coupled to movable base 47. Movable base 47 may be supported by drive shaft 52 or may be configured to slide on rod-like part 21.

Link plates 45, 46, like link plates 41 to 44, have an elongate rectangle plate shape. One ends of link plates 45, 46 are coupled to movable base 47 through rotary joints 45a, 46a, respectively, while the other ends thereof are coupled near the central portions of link plates 41, 43 through rotary joints 45b, 46b, respectively. Rotary joints 45a, 45b, 46a, 46b extend parallel to the axis of workpiece 5 held by suction pad 22.

In this way, a transmission mechanism 40 for transmitting a drive power of drive unit 50 to gripping pawls 31, 32 is configured so that gripping pawls 31, 32 are moved at the same time between the retreated position and the gripping position as shown in FIGS. 1A to 1C by drive unit 50.

The operation of transmission mechanism 40 will be described below in more detail. As shown in FIG. 1A, when movable base 47 is positioned nearer to base plate 10 by drive unit 50, gripping pawls 31, 32 are both moved to the retreated position. At this time, link plates 41, 43 coupling gripping pawls 31, 32 to rod-like part 21 are moved, by link plates 45, 46 coupling link plates 41, 43 to movable base 47, into a rotation position where rotary joints 45b, 46b between them are moved into a position nearer to base plate 10. In the shown example, rotary joints 45b, 46b are positioned nearer to base plate 10 than rotary joints 41b, 43b between link plates 41, 43 and rod-like part 21. Thus, link plates 41, 43 are tilted so that the sides thereof nearer to gripping pawls 31, 32 (the sides nearer to rotary joints 41a, 43a) are positioned nearer to base plate 10.

When movable base 47, together with link plates 45, 46 coupled thereto, is moved by drive unit 50 toward suction pad 22 from the retreated position shown in FIG. 1A, rotary joints 45b, 46b are also moved in the direction toward suction pad 22. Thereby, link plates 41, 43 are rotated so that the sides thereof coupled to gripping pawls 31, 32 approach nearer to suction pad 22, with the result that gripping pawls 31, 32 are also moved nearer to suction pad 22. In this process, the other links 42, 44 respectively coupling gripping pawls 31, 32 to rod-like part 21 are rotated together with link plates 41, 43. As a result, gripping pawls 31, 32 are moved in an arc while maintaining the posture in which they extend parallel to rod-like part 21.

As movable base 47 is being moved toward suction pad 22, gripping pawls 31, 32 in due time arrive at the gripping position shown in FIG. 1C. In this process, as shown in FIG. 1B, gripping pawls 31, 32 operate so as to open, i.e. to increase the distance between them before link plates 42 to 44 arrive at the rotation position where they are perpendicular to rod-like part 21. After that, gripping pawls 41, 42 operate so as to close, i.e. to decrease the distance between them before they arrive at the gripping position and grips workpiece 5 in this process. In this way, drive unit 50, movable base 47, transmission mechanism 40 and gripping pawls 31, 32 constitute a secondary catching mechanism for sandwiching and gripping the workpiece held by suction pad (catching part) 22 of primary catching mechanism 20.

Next, with reference to FIGS. 2A to 2D, an operation of picking workpiece 5, positioned beside the wall of storage box 60, out of storage box 60 using gripping device 1 according to this embodiment.

In order to pick workpiece 5 out of storage box 60, gripping pawls 31 and 32 are first moved into the retreated position. This realizes a state where no component member of gripping device 1 exists around suction pad 22, as viewed from a radial direction of rod-like part 21. As a result, when suction pad 22 is brought close to workpiece 5 to be picked, gripping device 1 hardly interferes with workpieces other than to be picked or the wall of storage box 60.

Figure 2A:
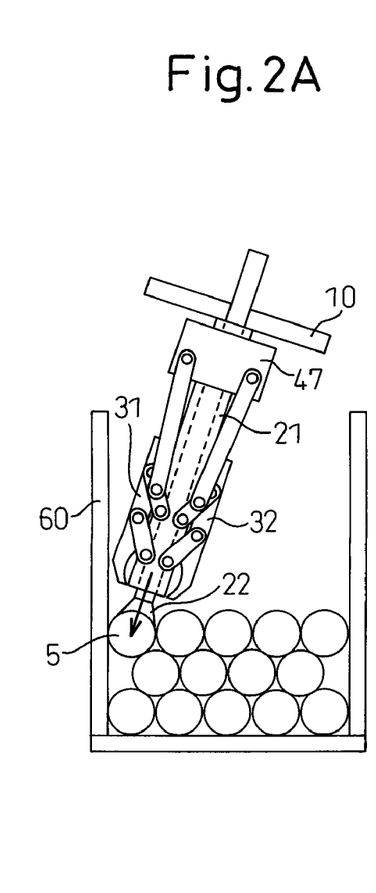
FIGS. 2A to 2D are diagrams schematically showing the steps, in time series, of a process for picking workpieces in a storage box using the gripping device according to the first embodiment shown in FIGS. 1A to 1D.

Next, as shown in FIG. 2A, in order to pick workpiece 5 positioned beside the wall, gripping device 1 is tilted by the robot arm, so that the end of rod-like part 21 on the side of suction pad 22 is positioned nearer to the wall in contact with workpiece 5 to be picked than the end of rod-like part 21 on the side of base plate 10. This makes it possible to contact suction pad 22 with workpiece 5 without interference.

Figure 2B:
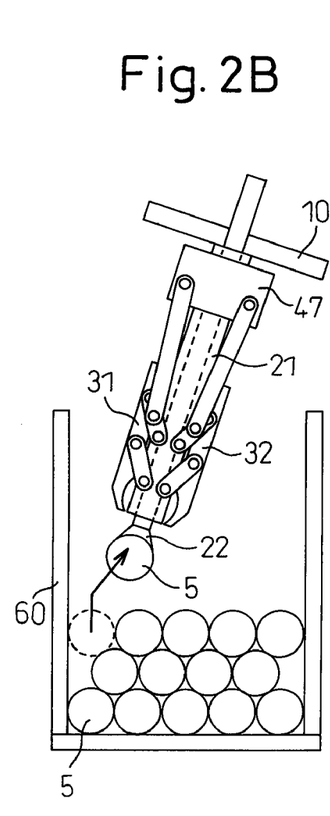
Figure 2C:
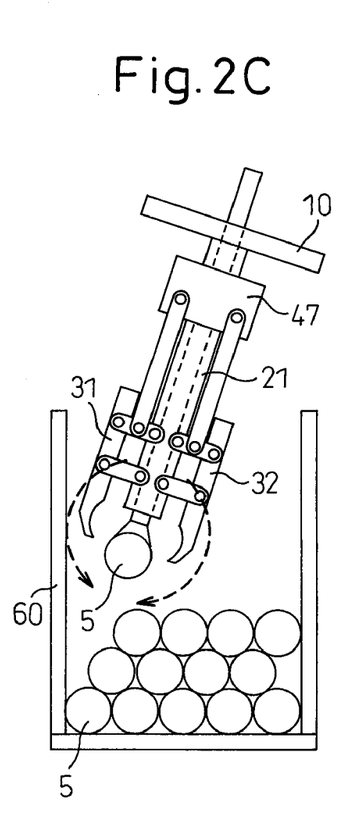

From this state, workpiece 5 can be held and moved by the suction power of suction pad 22. Then, as shown in FIG. 2B, workpiece 5 is moved slightly upward and slightly away from the wall (rightward in FIG. 2B). By doing in this way, as shown in FIG. 2C, a space sufficient to prevent gripping pawls 31, 32 from interfering with surrounding objects can be secured when gripping pawls 31, 32 is moved from the retreated position to the gripping position.

Figure 2D:
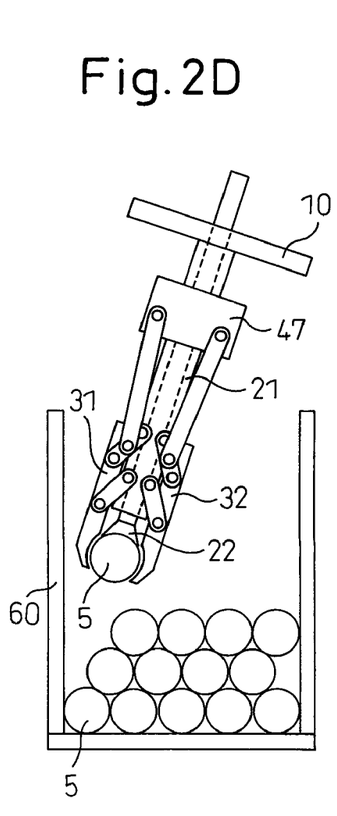

After that, as shown in FIG. 2D, gripping pawls 31, 32 are moved into the gripping position. By doing so, workpiece 5 can be held with higher stability. As a result, even if gripping device 1 is set in any of various postures at a comparatively high speed, the transport process can be executed with high stability.

As described above, gripping device 1 according to this embodiment is configured so that as viewed from the radial direction of rod-like part 21, gripping pawls 31, 32 can be retreated from the surrounding of suction pad 22 mounted on the forward end of rod-like part 21. This makes it possible for gripping device 1 to bring suction pad 22 thereof into contact with desired workpiece 5 and pick it while avoiding interference with the surrounding objects, even if a plurality of workpieces 5 are stacked in storage box 60. After that, workpiece 5 is gripped by gripping pawls 31, 32 so that it can be held stably. Thus, according to gripping device 1 of this embodiment, workpiece 5 can be picked efficiently.

It should be noted that this embodiment is only illustrative of the present invention and various modification can be made within the scope of the invention defined in the appended claims. For example, transmission mechanism 40 enabling gripping pawls 31, 32 to operate as described above may be modified in various ways. Two links, though necessary and sufficient, between gripping pawls 31, 32 and rod-like part 21 may be replaced with three or more links as desired. Further, although it is preferable that a relatively simple transmission mechanism 40 is configured by a link mechanism as employed in the aforementioned embodiment, it may alternatively be configured using a cam or a gear with equal effect.

Figure 3A:
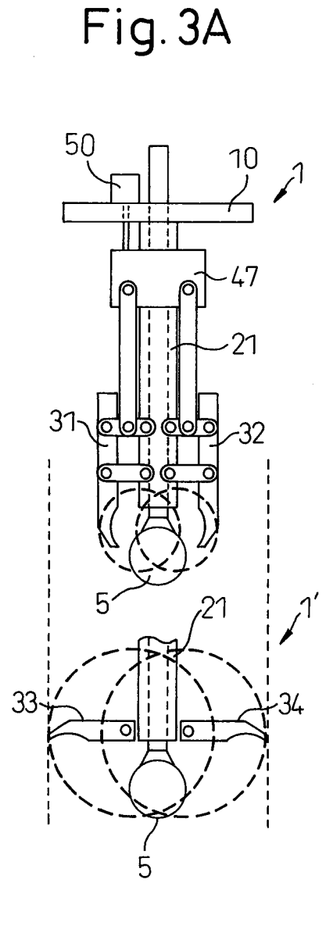
FIGS. 3A to 3C are diagrams comparing the gripping device according to the first embodiment shown in FIGS. 1A to 1D with a gripping device according to a variation of the first embodiment having gripping pawls each configured to rotate about one end thereof, FIG. 3A being a diagram comparing a space in which interference with the gripping pawls of the gripping device according to the first embodiment may occur during the operation with a space in which interference with the gripping pawls of the gripping device according to the variation of the first embodiment may occur during the operation, FIG. 3B being a diagram comparing the gripping pawls of the gripping device according to the first embodiment in the gripping position with the gripping pawls of the gripping device according to the variation of the first embodiment in the gripping position, and FIG. 3C being a diagram comparing the gripping pawls of the gripping device according to the first embodiment in the retreated position with the gripping pawls of the gripping device according to the variation of the first embodiment in the retreated position.
Figure 3B:
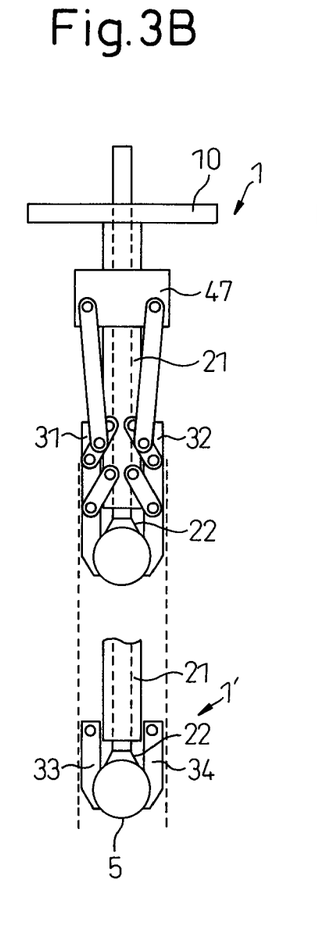
Figure 3C:
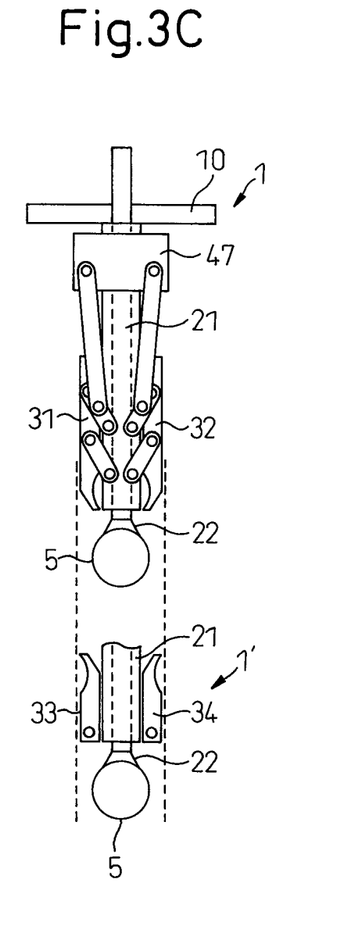
Figure 4A:
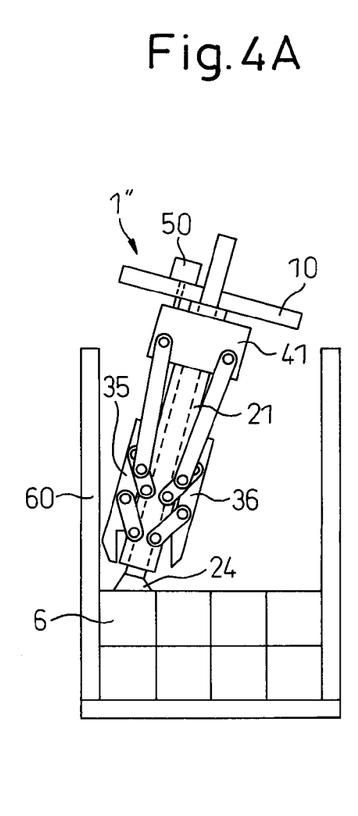
FIGS. 4A to 4D are diagrams schematically showing the steps, in time series, of a process for picking a prism-shaped workpiece using a gripping device according to another variation of the first embodiment shown in FIGS. 1A to 1D.
Figure 4B:
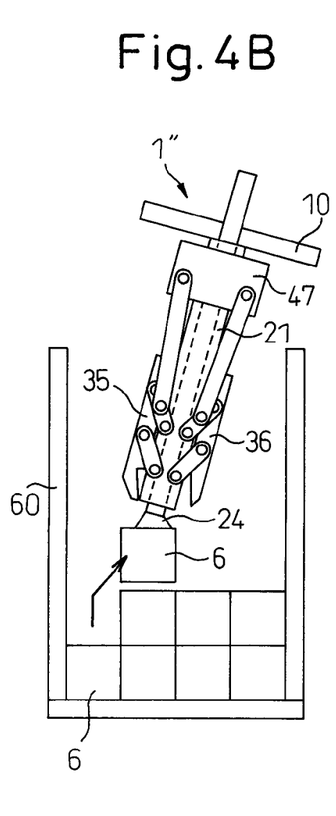
Figure 4C:
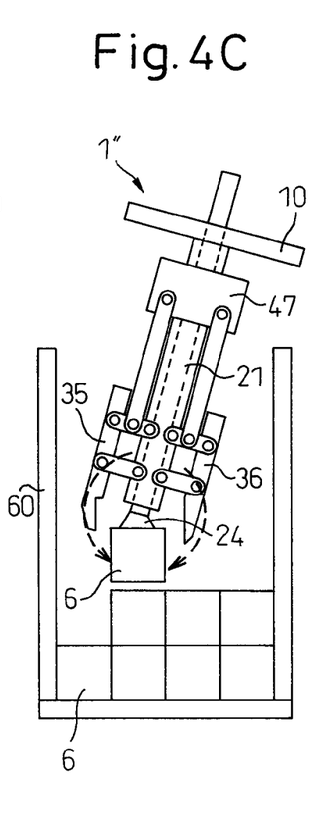
Figure 4D:
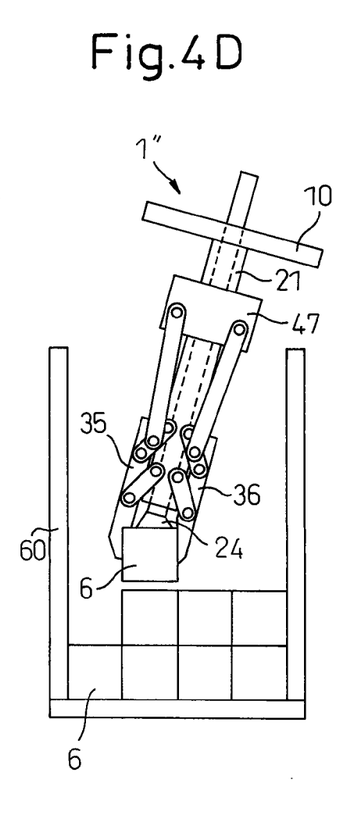

The operation of gripping pawls 31, 32 is not required to be strictly coincident with the operation described above. However, it is preferable that gripping pawls 31, 32 are configured to be moved while keeping the same posture with respect to rod-like part 21. As shown in FIGS. 3A to 3C, For example, gripping device 1' according to a variation of the first embodiment as shown in FIGS. 3A to 3C is possible which includes gripping pawls 33, 34, each configured to rotate about one end thereof, instead of gripping pawls 31, 32 of gripping device 1 according to the first embodiment shown in FIGS. 1A to 1D. Even in this case, as shown in FIGS. 3B and 3C, the area occupied by gripping pawls 33, 34 (lower side in FIGS. 3B and 3C) of gripping device 1' according to the variation can be the same in the gripping and retreated positions as the area occupied by gripping pawls 31, 32 (upper side in FIGS. 3B and 3C) of gripping device 1 according to the first embodiment shown in FIGS. 1A to 1D. On the other hand, during the movement from the retreated position to the gripping position, as shown in FIG. 3A, the space (designated schematically as a dashed circle) in which interference with gripping pawls 31, 32 (upper side in FIG. 3A) of gripping device 1 according to the first embodiment may occur can be much smaller than the space in which interference with gripping pawls 33, 34 (lower side in FIG. 3A) of gripping device 1' according to the variation may occur. Therefore, according to the first embodiment, as shown in FIG. 2C mentioned above, gripping operation can be performed smoothly by gripping pawls 31, 32 if gripping device 1 is separated from the wall, etc, by a small distance. Even if storage box 60 is relatively small, the gripping operation can be performed without moving gripping device 1 out of storage box 60. Thus, efficient picking is possible.

In the first embodiment, a configuration adapted to pick solid-cylindrical workpiece 5 has been illustrated by an example. However, a configuration adapted to pick a prism-shaped workpiece 6 as shown in FIGS. 4A to 4D may alternatively be employed. In gripping device 1'' according to another variation shown in FIGS. 4A to 4D, gripping pawls 35, 36 are used instead of gripping pawls 31, 32 of gripping device 1 according to the first embodiment, and the forward end of one gripping pawl 35 is formed with an angular groove conforming to the surface of prism-shaped workpiece 6, while the forward end of the other gripping pawl 36 is formed with a slanted surface. Further, in order to suit prism-shaped workpiece 6, suction pad 24 provided instead of suction pad 22 of gripping device 1 according to the first embodiment is modified into a shape different from that of suction pad 22 suitable for solid-cylindrical workpiece 5 in gripping device 1 according to the first embodiment. In addition, the shapes of the gripping pawls and the suction pad can be changed in accordance with the various shapes of the workpiece. Alternatively, in order to make a configuration applicable to a plurality of types of workpieces, the gripping pawls and the suction pad may have a more complicated shape, or a movable portion may be added thereto.

The example in which suction pad 22 utilizing an operation by air suction is used is described above as primary catching mechanism 20. This configuration is preferable because it can generate a relatively large holding power for various types of workpieces. However, if the workpiece is made of a magnetic material, a magnet may be used in place of suction pad 22.

Drive unit 50 is shown as being configured so as to be mounted on the surface of base plate 10 which is mounted on the robot arm. This configuration is preferable, because it eliminates the need for securing a space for drive unit 50 on the side from which rod-like part 21 is projected and consequently interference with the surrounding of gripping device 1 can be suppressed. However, a drive unit may be arranged on the side from which rod-like part 21 is projected, for example, by being built in movable base 47. Alternatively, apart from base plate 10, the drive unit may be built in the robot arm.

In the first embodiment, the configuration is illustrated in which gripping pawls 31, 32 and the mechanism for operating them are arranged laterally symmetrically and therefore, suction pad 22 is positioned on the center line between two gripping pawls 31, 32. This laterally symmetric configuration has an advantage that the operation amount of gripping pawls 31, 32 in the direction perpendicular to rod-like part 21 can be reduced to the minimum required to perform the gripping operation without interference with workpiece 5, thereby minimizing the space in which interference with gripping pawls may occur during the gripping operation. However, if a workpiece is shaped to have different left and right lengths when it is held by suction pad 22 at the center of gravity, for example, a laterally asymmetric configuration may be correspondingly employed. Such an asymmetric configuration can be achieved, for example, by lengthening the link plate coupled to one of gripping pawls 31, 32 as compared with the link plate coupled to the other gripping pawl.

Second Embodiment

FIGS. 5A to 5D show a gripping device 2 according to a second embodiment of the present invention. In FIGS. 5A to 5D, parts corresponding to those of the first embodiment are denoted by the same reference numerals, respectively, and the detailed description thereof will be omitted.

According to this embodiment, in the primary catching mechanism 25, rod-like part 26 having suction pad 22 mounted at one end thereof is configured to be movable with respect to base plate 10. Base plate 10 is formed with an opening 11 which allows rod-like part 26 to pass therethrough. Base projection plates 71, 72 extending in a direction perpendicular to base plate 10 are coupled to the opposite edge portions of opening 11, respectively. Rod-like part 26 is configured to be movable through opening 11 between base projection plates 71, 72 along the axis thereof in a direction perpendicular to base plate 10.

Similarly to the first embodiment, any of various known devices such as an air cylinder, a hydraulic cylinder and a motor can be used as drive unit 50 for moving rod-like part 26 along the axis thereof, and drive unit 50 includes a body 51 and a drive shaft 52 driven so as to extend from and contract into body 51. Rod-like part 26 may be configured to be supported by drive shaft 52 of drive unit 50, etc., or may be configured to be supported slidably by base projection plates 71, 72 or opening 11.

Gripping pawl 31, similarly to the first embodiment in which it is coupled to rod-like unit 21, is coupled to base projection plate 71 through link plates 73, 74 and rotary joints 73a, 73b, 74a, 74b. One link plate 73 extends beyond rotary joint 73b rotatably coupled to base projection plate 71 and is coupled to rod-like part 26 by the configuration in which rotary joint 73d mounted on rod-like part 26 is fitted in a longitudinally elongate slot 73c formed at the forward end of link plate 73.

Similarly, gripping pawl 32 is coupled to base projection plate 72 through link plates 75, 76 and rotary joints 75a, 75b, 76a, 76b. One link plate 75 extends beyond rotary joint 75b rotatably coupled to base projection plate 72 and is coupled to rod-like part 26 through rotary joint 75d and a slot 75c formed at the forward end of link plate 73. In this way, a transmission mechanism 70 configured to transmit the drive power of drive unit 50 to gripping pawls 31, 32 is provided.

Figure 5A:
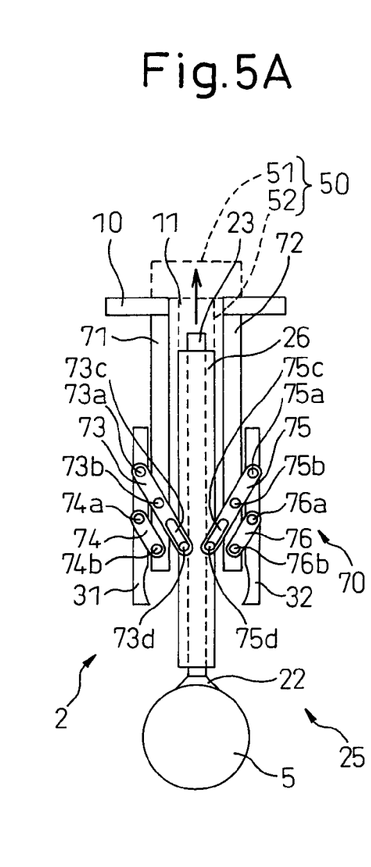
FIGS. 5A to 5D are schematic diagrams showing a gripping device according to a second embodiment of the present invention, FIGS. 5A to 5C being front views showing a gripping operation of the gripping device in time series and FIG. 5D being a side view of the gripping device shown in FIG. 5C.

In the configuration of this embodiment, as shown in FIG. 5A, by moving rod-like part 26 in a direction away from base plate 10, gripping pawls 31, 32 are arranged in the retreated position where they are retreated from suction pad 22 toward base plate 10. Specifically, by arranging rotary joints 73d, 75d mounted on rod-like part 26 at a position farther from base plate 10, the other rotary joints 73a, 75a of links 73, 75 are arranged at a position nearer to base plate 10. As a result, gripping pawls 31, 32 coupled to rotary joints 73a, 75a are also positioned nearer to base plate 10. Thus, in keeping with the movement of suction pad 22 in the direction away from base plate 10, gripping pawls 31, 32 are moved away from suction pad 22 in the direction along the axis of rod-like part 26.

Figure 5B:
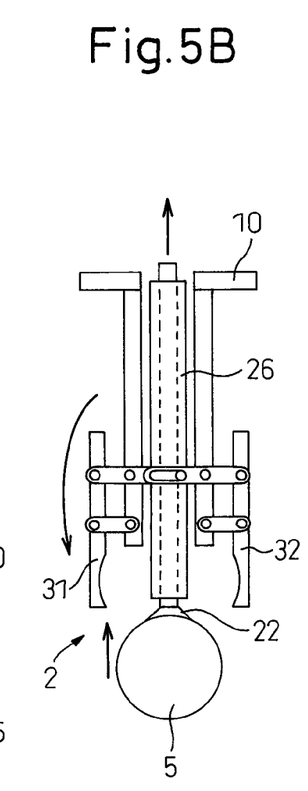
Figure 5C:
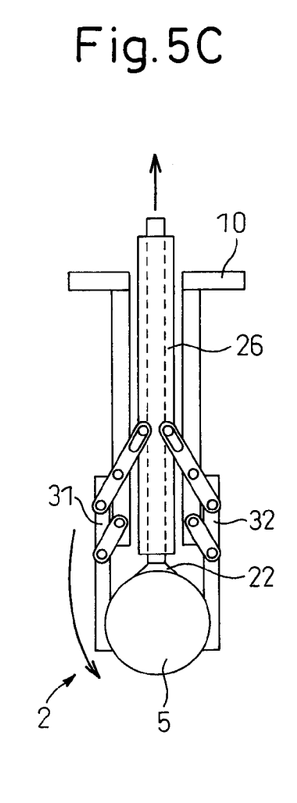
Figure 5D:
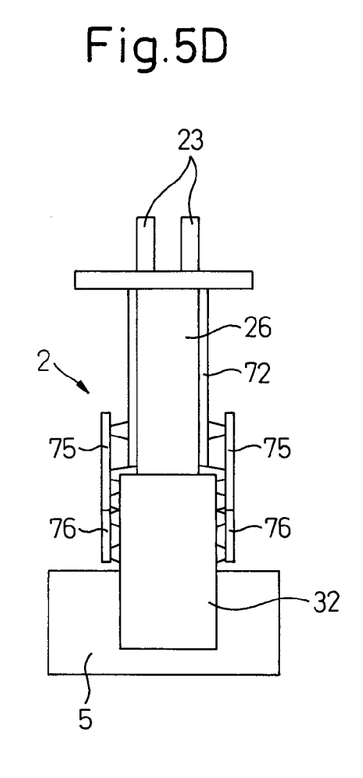

As rod-like part 26 is moved toward base plate 10 from the retreated position shown in FIG. 5A, gripping pawls 31, 32 are first opened, as shown in FIG. 5B, and then closed while moving toward suction pad 22 in the opposite direction from rod-like part 26. After that, gripping pawls 31, 32 reach the gripping position as shown in FIG. 5C where held workpiece 5 is sandwiched from the side surfaces thereof by gripping pawls 31, 32.

In the configuration of the second embodiment described above, gripping pawls 31, 32 also can be arranged in the state where they are away from the surrounding of suction pad 22, so that gripping device 2 becomes less liable to interfere with the objects surrounding workpiece 5 to be picked. In this process, according to the configuration of the second embodiment, suction pad 22 as well as gripping pawls 31, 32 are moved along the axis of rod-like part 26. As a result, a relatively large distance of relative movement along the axis of rod-like part 26 can be secured between gripping pawls 31, 32 and suction pad 22 without increasing the opening width of gripping pawls 31, 32 in the direction perpendicular to the axis of rod-like part 26. Thus, gripping pawls 31, 32, when they are moved into the retreated position, can be arranged at a position relatively far from suction pad 22, thereby further improving the function of suppressing the interference of gripping device 2.

Please note that rod-like part 21 also may be made movable in the first embodiment as an additional function. However, in such a case, in addition to drive unit 50 of movable base 47, an additional drive unit is required to move rod-like part 21. On the other hand, in the configuration according to the second embodiment, both suction pad 22 and gripping pawls 31, 32 also can be operated by single drive unit 50 alone for moving rod-like part 26.

Figure 6A:
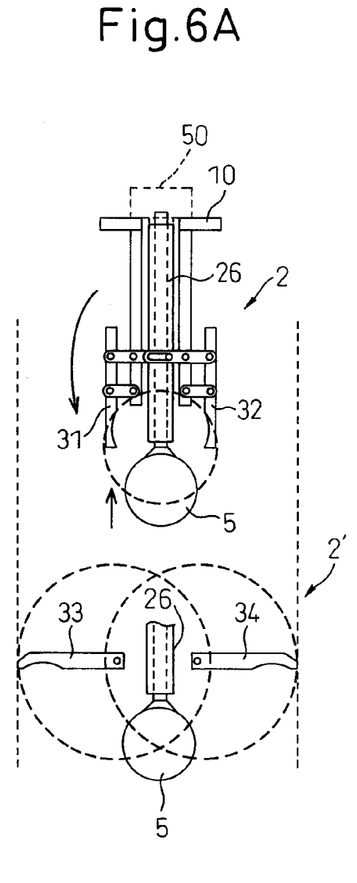
FIGS. 6A to 6C are diagrams comparing the gripping device according to the second embodiment shown in FIGS. 5A to 5D with a gripping device according to a variation of the second embodiment having gripping pawls each configured to rotate about one end thereof, FIG. 6A being a diagram comparing a space in which interference with the gripping pawls of the gripping device according to the second embodiment may occur during the operation with a space in which interference with the gripping pawls of the gripping device according to the variation of the second embodiment may occur during the operation, FIG. 6B being a diagram comparing the gripping pawls of the gripping device according to the second embodiment in the gripping position with the gripping pawls of the gripping device according to the variation of the second embodiment in the gripping position, and FIG. 6C being a diagram for comparing the gripping pawls of the gripping device according to the second embodiment in the retreated position with the gripping pawls of the gripping device according to the variation of the second embodiment in the retreated position.
Figure 6B:
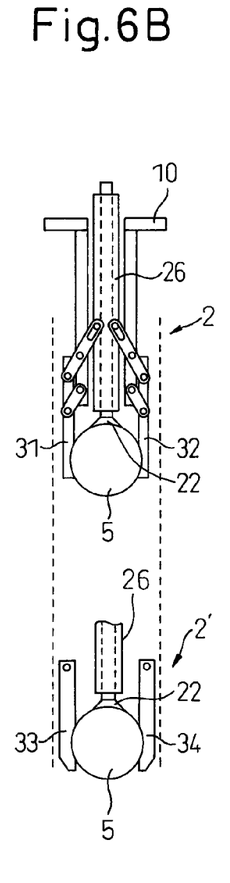
Figure 6C:
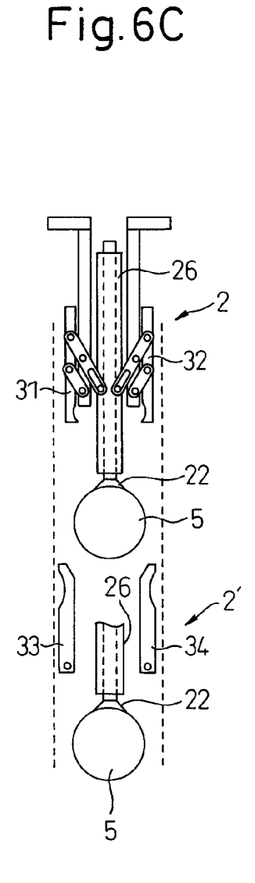

Further, in the second embodiment, gripping pawls 31, 32 are preferably moved while maintaining the same posture with respect to rod-like part 26. For example, as shown in FIGS. 6A to 6C, as compared with gripping device 2' (lower side in FIGS. 6A to 6C) according to a variation including gripping pawls 33, 34 each rotated about one end thereof, instead of gripping pawls 31, 32 of gripping device 2 according to the second embodiment shown in FIGS. 5A to 5D, gripping pawls 31, 32 (upper side in FIGS. 6A to C) of gripping device 2 according to the second embodiment in which they are operated while maintaining the same posture with respect to rod-like part 26 can reduce the space in which interference can occur during the gripping operation. As a result, efficient picking is possible.

What is claimed is:
1. A workpiece gripping device comprising:
a catching mechanism having a catching part for holding a workpiece by suction force or magnetic force, and a rod-like part having the catching part mounted at one end thereof;
at least two gripping pawls for sandwiching and gripping the workpiece held by the catching part;
a drive unit for supplying a drive power; and
a transmission mechanism for transmitting the drive power of the drive unit to the gripping pawls,
wherein the transmission mechanism moves the gripping pawls along an axis of the rod-like part between a gripping position where the gripping pawls are projected beyond an end of the rod-like part on which the catching part is mounted and a retreated position where the gripping pawls are positioned behind the catching part toward an end of the rod-like part on the side opposite to the catching part, and the gripping pawls are moved to the gripping position along the axis of the rod-like part while shortening the distance between the gripping pawls, whereby no component member of the gripping device exists around the catching part, as viewed from a radial direction of the rod-like part,
wherein the rod-like part is configured to be moved by the drive unit along the axis of the rodlike part with respect to a gripping device base,
wherein the transmission mechanism comprises:
at least two base projection plates coupled to the gripping device base and extending along and beside the rod-like part;
first links each having one end rotatably coupled to a corresponding one of the gripping pawls, a central portion rotatably coupled to the corresponding one of the base projection plates, and the other end coupled to the rod-like part so as to be rotatable and slidable in a longitudinal direction of each of the first links; and
second links each having one end rotatably coupled to a corresponding one of the gripping pawls and the other end rotatably coupled to the corresponding one of the base projection plates.
2. The workpiece gripping device according to claim 1, wherein the gripping device base is adapted to be mounted on an arm of a robot, and said drive unit is arranged on the side of the gripping device base nearer to the arm of the robot.

* * * * *